United States Patent
Bilbrey et al.

(10) Patent No.: US 10,683,100 B2
(45) Date of Patent: Jun. 16, 2020

(54) PILOT AND PASSENGER SEAT

(71) Applicant: Bell Helicopter Textron Inc., Fort Worth, TX (US)

(72) Inventors: Levi Bilbrey, Fort Worth, TX (US); Jeremy Robert Chavez, Colleyville, TX (US); Joshua Edler, Colleyville, TX (US); James R. Williamson, Southlake, TX (US); Joseph Scott Drennan, Dallas, TX (US); Doug Fidler, Keller, TX (US); Rares Halmagean, McKinney, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 151 days.

(21) Appl. No.: 15/913,756

(22) Filed: Mar. 6, 2018

(65) Prior Publication Data

US 2018/0251209 A1 Sep. 6, 2018

Related U.S. Application Data

(60) Provisional application No. 62/467,680, filed on Mar. 6, 2017.

(51) Int. Cl.
*B64D 43/00* (2006.01)
*A42B 3/30* (2006.01)
(Continued)

(52) U.S. Cl.
CPC .............. *B64D 43/00* (2013.01); *A42B 3/042* (2013.01); *A42B 3/0433* (2013.01); *A42B 3/228* (2013.01);
(Continued)

(58) Field of Classification Search
CPC ................ B64D 43/00; B64D 11/0626; B64D 11/0689; B64D 11/0647; B64D 2011/0046; B64D 11/0015; B64D 11/0646; B64D 11/0641; B64D 11/0624; G02B 27/017; G08G 5/0047; G08G 5/0091; G08G 5/0021; G08G 5/0039; G08G 5/0017; G08G 5/0004; G01C 23/00; G01C 23/005;
(Continued)

(56) References Cited

U.S. PATENT DOCUMENTS

D153,875 S   5/1949   Hager
D218,028 S   7/1970   Lohr
(Continued)

*Primary Examiner* — Assres H Woldemaryam
(74) *Attorney, Agent, or Firm* — Whitaker Chalk Swindle & Schwartz PLLC; Enrique Sanchez

(57) ABSTRACT

The present invention achieves technical advantages as a pilot and passenger seating. An aircraft employs a pilot seat, comprising a contoured structure having ergonomically formed and padded surfaces, with left and right arm supports that include an articulated control knob, movable in three rectangular axes and rotatable about a vertical axis to provide one or more aircraft steering functions for an aircraft, and a touch-sensitive control surface for controlling one or more power system components. A passenger seat, having a contoured structure, having ergonomically formed and padded surfaces, a headrest, a seat, a left support member, and a right support member are adapted to cradle a portion of a passenger's body to support the passenger during travel.

11 Claims, 7 Drawing Sheets

(51) Int. Cl.
| | |
|---|---|
| *G06F 3/01* | (2006.01) |
| *G01C 23/00* | (2006.01) |
| *G08G 5/00* | (2006.01) |
| *B64C 13/18* | (2006.01) |
| *B64C 13/22* | (2006.01) |
| *A42B 3/04* | (2006.01) |
| *A42B 3/22* | (2006.01) |
| *G06T 19/00* | (2011.01) |
| *G02B 27/01* | (2006.01) |
| *B64D 11/06* | (2006.01) |
| *B64C 13/04* | (2006.01) |
| *B64C 1/06* | (2006.01) |
| *B64C 1/18* | (2006.01) |
| *B64C 1/40* | (2006.01) |
| *B64C 13/10* | (2006.01) |
| *B64D 11/00* | (2006.01) |
| *G06F 3/044* | (2006.01) |

(52) U.S. Cl.
CPC ............... *A42B 3/30* (2013.01); *B64C 1/066* (2013.01); *B64C 1/18* (2013.01); *B64C 1/40* (2013.01); *B64C 13/042* (2018.01); *B64C 13/044* (2018.01); *B64C 13/18* (2013.01); *B64C 13/22* (2013.01); *B64D 11/0626* (2014.12); *B64D 11/0647* (2014.12); *B64D 11/0689* (2013.01); *G01C 23/00* (2013.01); *G01C 23/005* (2013.01); *G02B 27/017* (2013.01); *G06F 3/012* (2013.01); *G06F 3/017* (2013.01); *G06T 19/006* (2013.01); *G08G 5/0004* (2013.01); *G08G 5/0017* (2013.01); *G08G 5/0021* (2013.01); *G08G 5/0039* (2013.01); *G08G 5/0047* (2013.01); *G08G 5/0091* (2013.01); *B64C 13/10* (2013.01); *B64D 11/0015* (2013.01); *B64D 11/0641* (2014.12); *B64D 11/0646* (2014.12); *B64D 2011/0046* (2013.01); *G06F 3/044* (2013.01)

(58) Field of Classification Search
CPC .. B64C 1/40; B64C 1/18; B64C 1/066; B64C 13/042; B64C 13/044; B64C 13/22; B64C 13/18; B64C 13/10; G06T 19/006; A42B 3/228; A42B 3/0433; A42B 3/042; A42B 3/30; G06F 3/017; G06F 3/012; G06F 3/044

See application file for complete search history.

(56) References Cited

U.S. PATENT DOCUMENTS

| | | | | |
|---|---|---|---|---|
| 3,703,931 | A * | 11/1972 | Page | E02F 9/2004 172/4.5 |
| 4,239,282 | A | 12/1980 | White | |
| 4,484,191 | A * | 11/1984 | Vavra | G01C 9/06 340/965 |
| 4,517,424 | A * | 5/1985 | Kroczynski | B41J 5/10 200/5 R |
| D283,470 | S | 4/1986 | Zimmerman | |
| D354,629 | S | 1/1995 | Chapman | |
| 5,945,646 | A * | 8/1999 | Miller | B60K 35/00 200/5 R |
| 6,089,501 | A * | 7/2000 | Frost | B64C 27/021 244/17.11 |
| 6,744,898 | B1 * | 6/2004 | Hirano | H04R 5/023 381/333 |
| D541,540 | S | 5/2007 | Begin et al. | |
| D541,541 | S | 5/2007 | Begin et al. | |
| 7,302,322 | B1 * | 11/2007 | Szczerba | B60R 16/0231 701/29.6 |
| D577,502 | S | 9/2008 | Fissette et al. | |
| 9,346,356 | B2 * | 5/2016 | Hisatsugu | B60K 35/00 |
| 9,703,476 | B1 * | 7/2017 | Pappas | G06F 3/04847 |
| 10,052,976 | B2 | 8/2018 | Atger et al. | |
| 2004/0031667 | A1 * | 2/2004 | Dinkel | B60Q 1/1476 200/5 A |
| 2010/0269250 | A1 * | 10/2010 | Wilson | A47K 11/026 4/483 |
| 2013/0166169 | A1 * | 6/2013 | McCollough | F02C 9/28 701/99 |
| 2015/0261379 | A1 * | 9/2015 | Kneuper | G08G 5/0052 345/173 |
| 2015/0314857 | A1 * | 11/2015 | Cherepinsky | B64D 11/0689 244/223 |
| 2016/0027428 | A1 * | 1/2016 | Gul | H04R 27/00 381/71.4 |
| 2016/0176541 | A1 * | 6/2016 | Kneuper | B64D 45/0005 701/3 |
| 2016/0368593 | A1 * | 12/2016 | Miller | B64D 11/0689 |
| 2018/0356907 | A1 * | 12/2018 | Parazynski | G05G 9/04737 |

\* cited by examiner

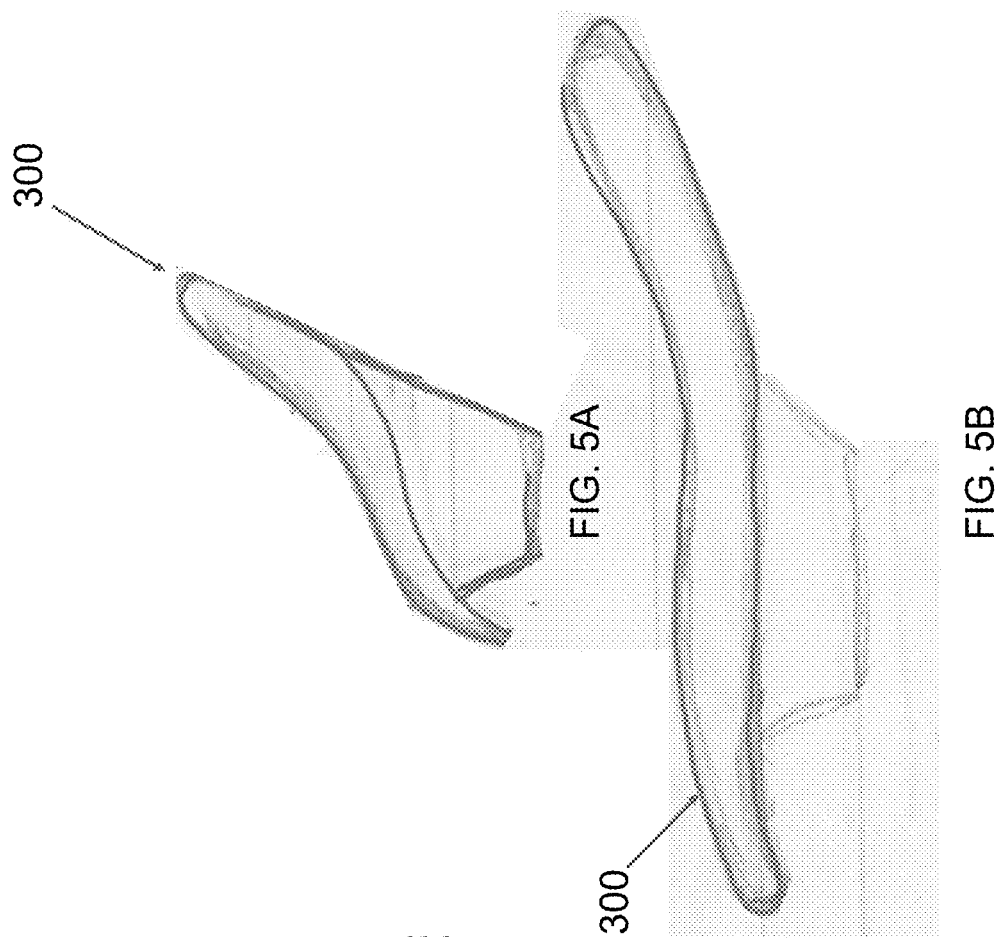

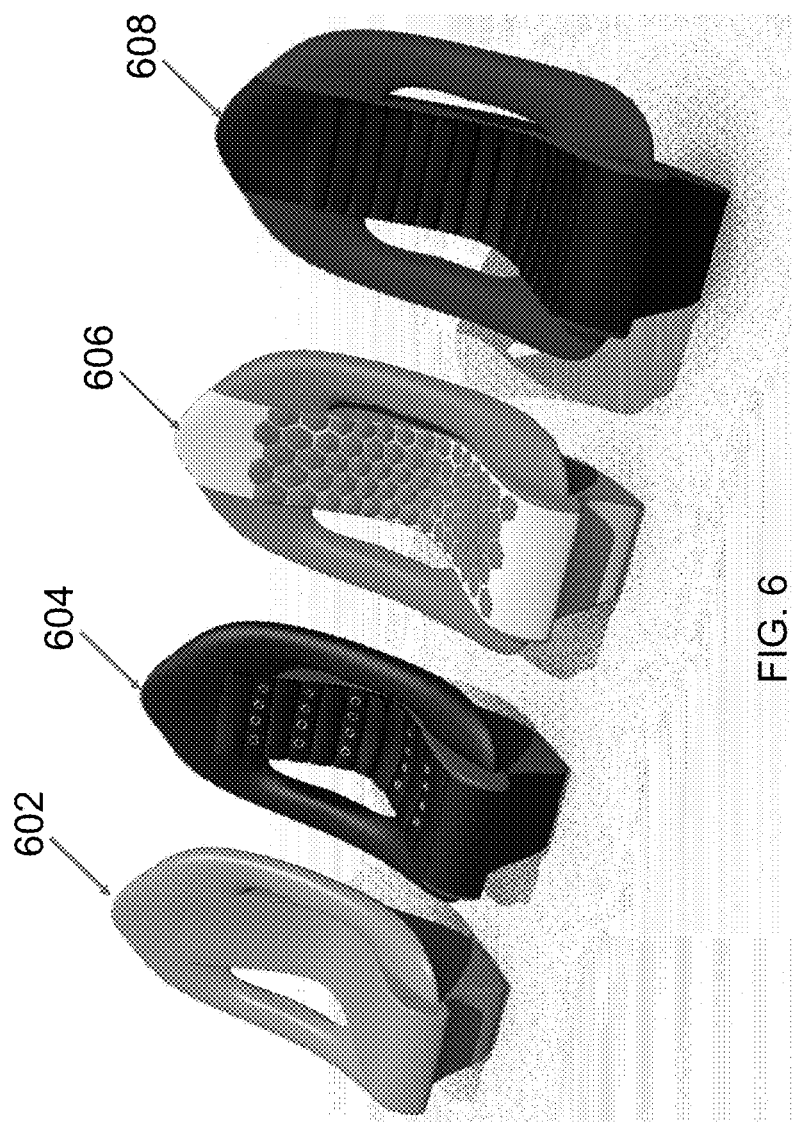

PILOT AND PASSENGER SEAT

BACKGROUND OF THE INVENTION

1. Field of the Invention

The present invention generally relates to vehicles and more particularly to pilot seating having integrated flight controls and adaptable passenger seating.

2. Background of the Invention

Conventional aircraft are characterized by massive instrumentation positioned in front of the pilot seat, with manual flight controls including cyclic, collective, anti-torque pedal mechanisms, and throttle controls that are often integrated into the collective control. As is well known, the cyclic control is typically configured like a joystick to enable the pilot to vary the pitch angle of ailerons or rotor blades so that the angle of attack can be changed to control the lift and direction of motion of the aircraft, forward, backward, sideways, hovering, etc. by producing a thrust vector to accomplish the needed operation.

In airplanes, the throttle allows the pilot to change the mass flow-rate of air (in fuel-injected engines) or air/fuel mixture (in carbureted engines) delivered to the cylinders. In helicopters, the collective control allows the pilot to change the pitch angle of all of the main rotor blades simultaneously and together to increase or decrease the lift provided by the main rotor or to produce acceleration together with an increase in the total lift during a climb or ascent. The anti-torque pedals—there are usually two—allow the pilot to change the tail rotor blade pitch to increase or decrease the thrust to produce a nose yaw to the left or right as needed to maintain a steady orientation of the helicopter during flight. The throttle, of course, is used to control the power developed by the engine(s) that drive the rotor. For each function, there are one or more components corresponding to such function, cluttering an already cluttered cockpit and adding unneeded complexity.

During travel, a passenger is subjected to myriad forces that can jostle the passenger in his or her seat. Typically, aircraft include conventional passenger seats having straight backs, seats, and arm rests. Such configurations are static, uncomfortable, and provide little support to counteract the rigors forces exerted during often turbulent travel. Newer aircraft attempt to provide support via modest cushioning and cantilevered headrests. None of which provide any stability for the passenger's body.

There is thus a need for seating that lacks these disadvantages so that an aircraft that is efficient, safer to operate, more comfortable, and can benefit from updated flight control mechanisms.

SUMMARY OF THE INVENTION

Accordingly there is disclosed a pilot seat, comprising a contoured structure having ergonomically formed and padded surfaces; a left arm support connected to the contoured structure; and a right arm support connected to the contoured structure, wherein the right arm support includes an articulated control knob that is movable in three rectangular axes and rotatable about a vertical axis to provide one or more aircraft steering functions for an aircraft, and wherein the left arm support includes a touch-sensitive control surface for controlling one or more power system components.

In other aspects, the invention includes:
- a retractable under-seat module containing controls for use in emergencies including a display device, a cyclic, a collective, anti-torque pedals, and a throttle.
- power system controls that include engine throttle, engine speed, and fuel delivery.
- aircraft steering functions that include control of an aircraft's yaw, pitch, roll, forward, backward, right, left, and hover.
- a headgear interface adapted to receive a cable coupled to a headgear.
- a plurality of speakers adapted to steerably direct sound.
- a tactile generator adapted to generate tactile notifications.

Another embodiment of the invention includes a passenger seat, with a contoured structure, having ergonomically formed and padded surfaces; a headrest, integrated with a top of the contoured structure; a seat, integrated with a bottom of the contoured structure; a left support member coupled to a first side of the contoured structure, proximate the top of the contoured structure, the left support member extending downwardly toward and coupled to a first side of the seat; a right support member coupled to a second side of the contoured structure, proximate the top of the contoured structure, the right support member extending downwardly toward and coupled to a second side of the seat; a first opening disposed between the left support member and the first side of the contoured structure; and a second opening disposed between the right support member and the second side of the contoured structure, wherein the contoured structure, the headrest, the seat, the left support member, and the right support member are adapted to cradle a portion of a passenger's form to support the passenger during travel.

In other aspects, the invention includes:
- a plurality of meshed vents disposed within the contoured structure and the seat.

The contoured structure, the headrest, the seat, the left support member, and the right support member are formed of memory foam other suitable material.

The contoured structure, the headrest, the seat, the left support member, and the right support member extend horizontally to substantially form a bed.

lighting elements are disposed in at least a portion of a seam of the seat.

The contoured structure and the seat are integrated into a single body.

Yet another embodiment of the invention includes a pilot seat control system, comprising a contoured structure having a left arm support and a right arm support; an articulated control knob that is movable in a horizontal plane, along a vertical axis, and rotatable about the vertical axis, to provide one or more aircraft steering functions for an aircraft, and a touch-sensitive control surface for controlling one or more power system components; a virtual flight control device is operably connected to the control knob and the control surface, and configured to receive data from the control knob and the control surface to control the aircraft.

In other aspects, the invention includes:
- a sensory feedback module configured to provide sensory alerts to the pilot related to the received data.
- a plurality of speakers, positioned to provide directional sound related to objects and elements located inside and outside of the aircraft such that the pilot perceives a sound emanating from a direction of the location.
- the control knob is configured to provide cyclic or collective control of the aircraft.

the control surface is configured to initiate a one or more power system controls, including one or more of engine throttle, engine speed, and fuel delivery.

Other embodiments in accordance with the spirit and scope of the invention will become apparent to those of skill in the art.

DETAILED DESCRIPTION OF THE INVENTION

Described herein is an embodiment of aircraft seating that advances the state of the art in several significant functional aspects. A pilot seat that includes operating controls for the cyclic, collective, anti-torque and throttle functions implemented with a small joystick knob integrated into one armrest of the pilot seat and a touch-sensitive panel integrated into the other armrest of the pilot seat. Passenger seating provides contoured support to counteract the rigorous forces exerted during often turbulent travel and stability for the passenger's body.

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
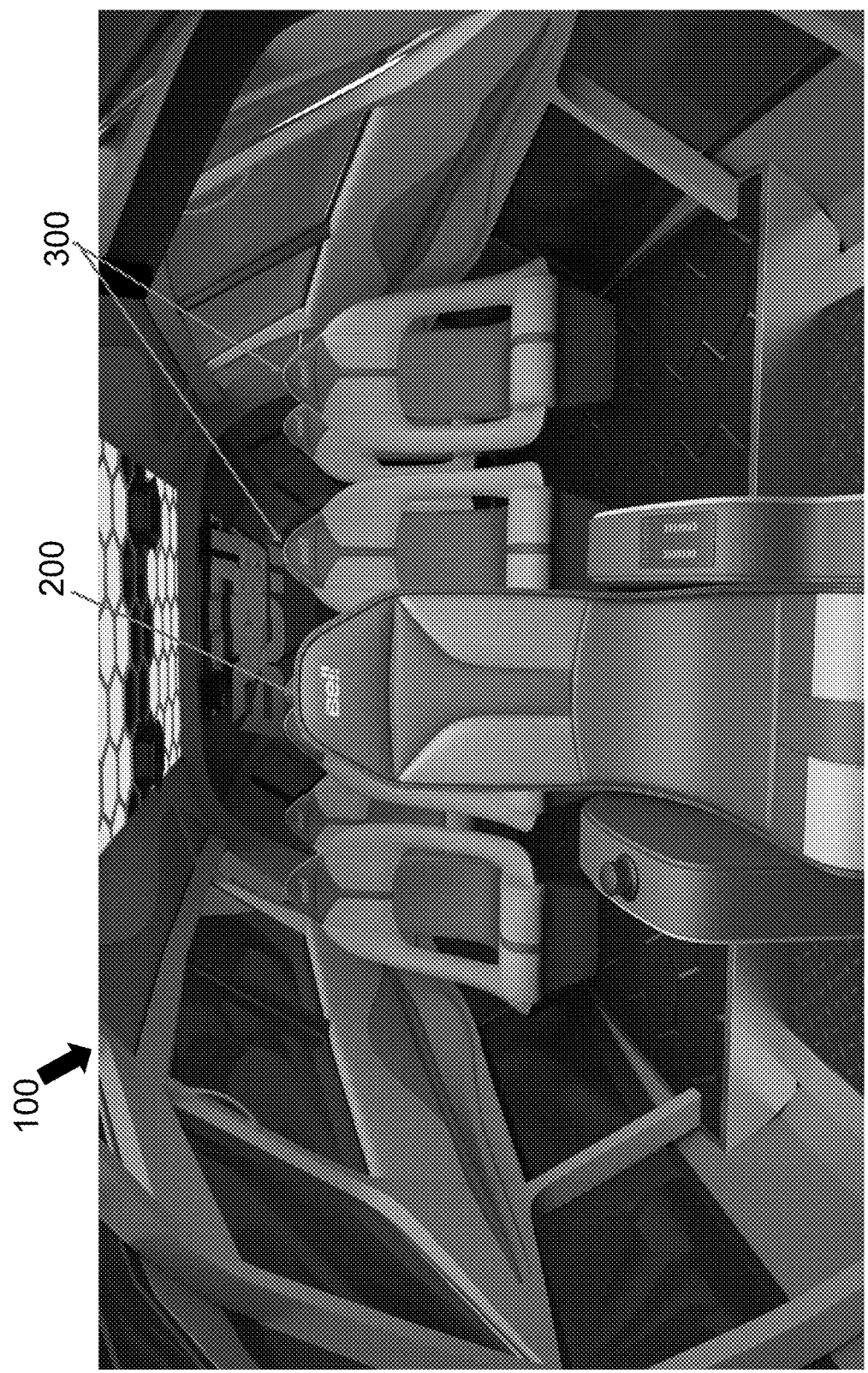
FIG. 1 illustrates a rearward view of one embodiment of the interior seating for a pilot and passengers, in accordance with one embodiment of the present invention.

Referring to FIG. 1, there is shown a rearward view of one embodiment of the interior seating for a pilot and passengers, in accordance with one embodiment of the present invention. One or more pilot seats 200 are typically forward of a passenger seating area having a plurality of passenger seats 300 in an aircraft cabin 100.

Figure 2:
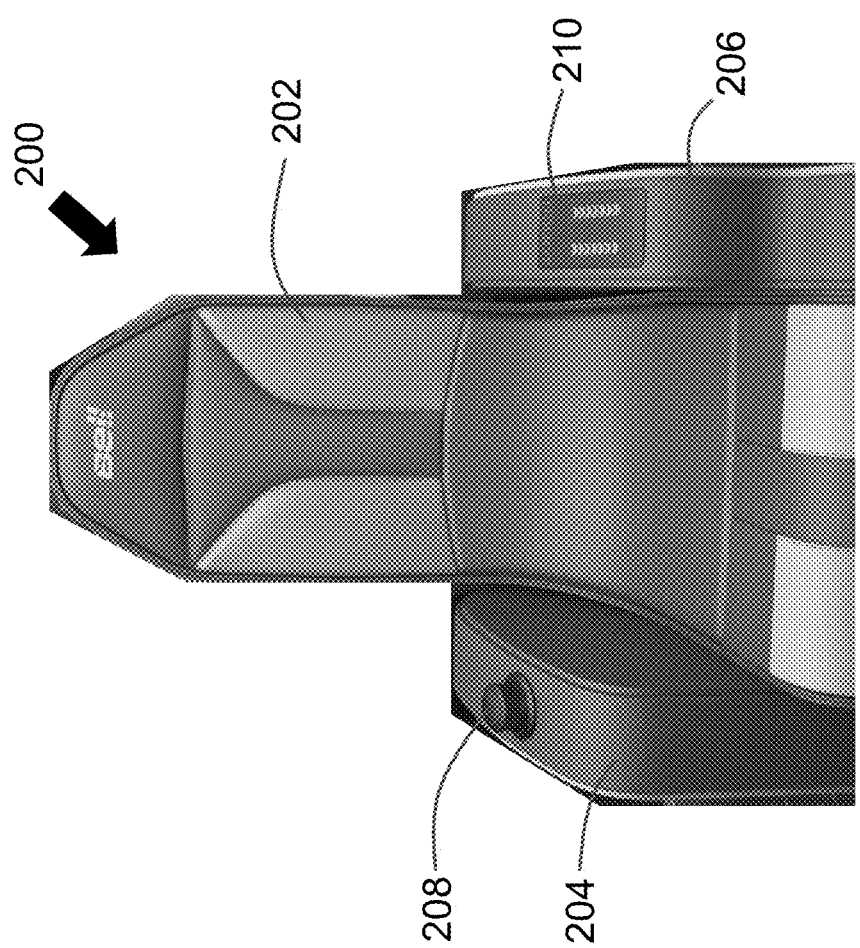
FIG. 2 illustrates a perspective view of a pilot seat, in accordance with one embodiment of the present invention.

Referring now to FIG. 2, there is shown a perspective view of a pilot seat 200, in accordance with one embodiment of the present invention. The pilot seat 200 includes a contoured structure 202 having ergonomically formed and padded surfaces. The contoured structure 202 can comprise an articulated frame encapsulated in a foam padding. The foam can be a high density foam, a polyurethane foam, a memory foam, or other suitable material. The contoured structure 202 has a top side and a bottom side, as well as left and right sides. The bottom side of the contoured structure 202 is contoured forward, avoiding the traditional crack between a seat's backrest and seat member.

A right arm support 204 is coupled to the contoured structure 202 and adapted to support a pilot's left arm, while seated. The right arm support 204 includes an articulated control knob 208 that is movable in three rectangular axes and rotatable about a vertical axis to provide one or more aircraft steering functions for an aircraft. The articulated control knob 208 can move in a horizontal plane, along a vertical axis, and can be rotatable about the vertical axis, to provide one or more aircraft steering functions for the aircraft. The control knob 208 can provide steering functions with Six-Degrees-of-Freedom. In another embodiment, the control knob 208 can be removably connected to a control interface (not shown) disposed in the right arm support 204.

The control knob 208 preferably controls aircraft steering functions for an aircraft, including an aircraft's yaw, pitch, roll, forward, backward, right, left, and hover. The control knob 208 can also steer a taxiing aircraft not in flight. The control knob 208 can be configured to provide cyclic or collective control of the aircraft. In other words the control knob 208 can replace the functionality as an aircraft's flight stick and pedals in a much more compact, intuitive, and ergonomic package.

A left arm support 206 is coupled to the contoured structure 202 and adapted to support a pilot's left arm, while seated. The left arm support 206 includes a touch-sensitive control surface 210 for controlling one or more power system components. The control surface 210 preferably includes a capacitive touch screen panel, but can alternatively include a resistive touch screen panel, an optical touchscreen panel, or other suitable touch or point sensitive mechanism. In another embodiment, the control surface 210 can be removably connected to a control interface (not shown) disposed in the left arm support 206. The control surface 210 can detect a pilot's touch, gesture, or multi-gesture, and correlate it with one or more power system controls. The control surface is preferably configured to initiate a one or more power system controls, including one or more of engine throttle, engine speed, and fuel delivery. Alternatively, the control surface 210 can be customized to perform specific tasks pursuant to a pilot's profile. The pilot's profile can also specify sensitivity and rates of change.

The pilot seat 200 can also include a headgear interface (not shown) adapted to receive a cable coupled to a headgear, to provide power and data communication. In another embodiment, a plurality of speakers can be disposed in the pilot seat 200 to steerably direct sound. The speakers can be positioned to provide directional sound related to objects and elements located inside and outside of the aircraft such that the pilot perceives a sound emanating from a direction of the location. In another embodiment, a tactile generator (not shown) can be disposed in the pilot seat 200 to generate tactile notifications, detectable by the pilot.

In one embodiment, the control surface 210 can be removably coupled to a control interface disposed in the left arm support 206 and the control knob 208 can be removably coupled to a control interface disposed in the right arm support 204. In another embodiment, the control surface 210 and control knob 208 can switch sides depending on pilot preference, such that the control surface 210 can be removably coupled to a control interface disposed in the right arm support 204 and the control knob 208 can be removably coupled to a control interface disposed in the left arm support 206.

In order to provide redundant controls in the event of a system failure, a retractable under-seat module having controls for use in emergencies including a display device, a cyclic, a collective, anti-torque pedals, and a throttle, can be deployed from within or proximate to the pilot seat 200.

Figure 3:
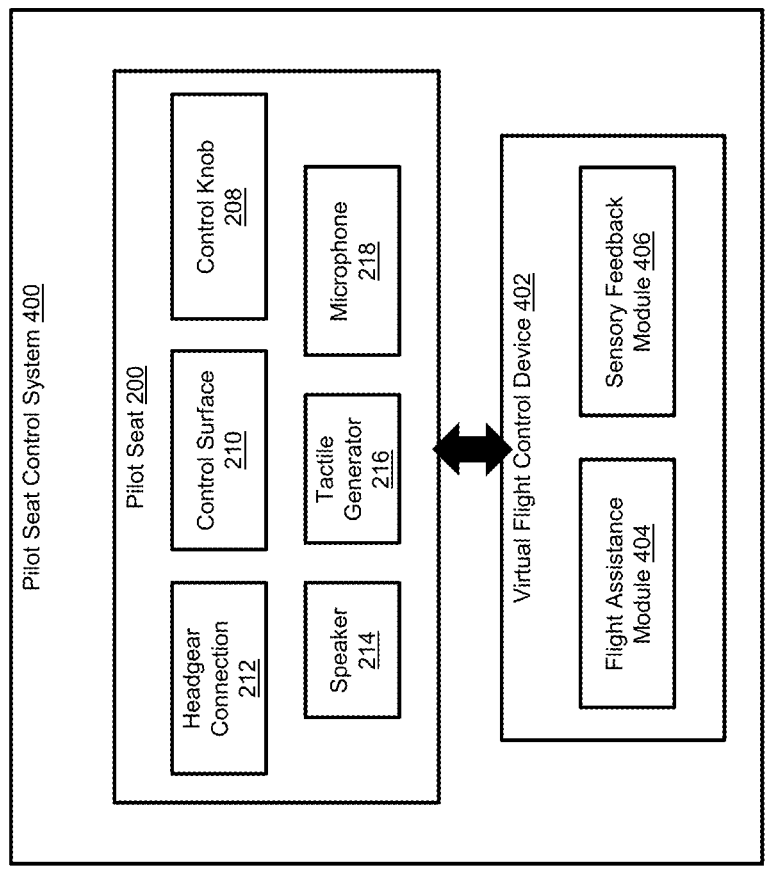
FIG. 3 illustrates a schematic of a pilot seat control system, in accordance with one embodiment of the present invention.

FIG. 3 illustrates a schematic of a pilot seat control system 400, in accordance with one embodiment of the present invention. The pilot seat control system 400 includes the pilot seat 200 and a Virtual Flight Control Device (VFCD) 402. The pilot seat 200 includes a headgear interface 212, a control surface 210, a control knob 208, a speaker 214, a tactile generator 216, and a microphone 218.

The VFCD 402 is operably connected to the control knob 208 and the control surface 210, and can be configured to receive data from the control knob 208 and the control surface 210 to control the aircraft. The VFCD 402 includes a Flight Assistance Module (FAM) 404 and a Sensory Feedback Module (SFM) 406. VFCD 120 is also configured to receive internal data from the control knob 208 and the control surface 210 and operably engage a flight control system to control the aircraft. VFCD 120 is configured to receive aircraft data, such as flight speed, altitude, engine temperature, fuel levels, and other data related to the aircraft.

Each pilot may configure a pilot profile with specific data, instruments, alerts, preferences, or other relevant information. The VFCD 120 reads the pilot profile upon pilot login and configures the system according to the profile, such that each pilot can have the information preferences he or she desires, when he or she desires, where he or she desires. This flexibility greatly increases usability and performance of the system. VFCD 120 is operably connected to the headgear interface 212, the control surface 210, the control knob 208, the speaker 214, the tactile generator 216, and the microphone 218, or other suitable means for data exchange.

VFCD 120 includes Flight Assistance Module (FAM) 122. FAM 122 is configured to provide predictive information to the pilot, such that the pilot does not have to perform time-consuming routine tasks. For example, FAM 122 can receive one or more control signals generated by the control knob 208 or control surface 210, processes the received signal to extract data, correlate the extracted data against a dictionary of commands and executes the command or send the command to a flight control system for execution. Other examples include adjustment of altitude, adjustment of cockpit temperature, and other relevant functions via input from the control knob 208 or control surface 210. The FAM 122 can also respond to commands via digitized voice responses played back via the seat speakers 214. Additionally, the FAM 122 can also respond to commands spoken by the pilot and captured via the seat microphone 218. The FAM 122 can be disposed within the VFCD 120, integrated into another device, or a stand-alone device.

Sensory Feedback Module (SFM) 124 is configured to provide control signals to the tactile generator disposed in the pilot seat 200. Sensory feedback module can vary the speed and duration of a motor to provide notifications via a pilot's sense of touch. Alternatively, SFM 124 can cause compression of compression cuffs, and control other tactile devices. The SFM 124 can be disposed within the VFCD 120, integrated into another device, or a stand-alone device. In another embodiment, a plurality of motors can be disposed in the pilot seat 200 and controlled by the SFM 124, to notify a pilot of internal or external events or conditions.

The VFCD 102, FAM 104, and SFM 106 can be implemented on one or more servers, having one or more processors, with access to electronic storage. Server(s) may include electronic storage, one or more processors, and/or other components. Server(s) may include communication lines, or ports to enable the exchange of information with a network and/or other computing platforms. Server(s) may include a plurality of hardware, software, and/or firmware components operating together to provide the functionality attributed herein to server(s). For example, server(s) may be implemented by a cloud of computing platforms operating together as server(s).

Electronic storage may comprise non-transitory storage media that electronically stores information. The electronic storage media of electronic storage may include one or both of system storage that is provided integrally (i.e., substantially non-removable) with server(s) and/or removable storage that is removably connectable to server(s) via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processor(s), information received from server(s), information received from computing platform(s), and/or other information that enables server(s) to function as described herein.

Processor(s) may be configured to provide information processing capabilities in server(s). As such, processor(s) may include one or more of a digital processor, an analog processor, a digital circuit designed to process information, an analog circuit designed to process information, a state machine, and/or other mechanisms for electronically processing information. Although processor(s) as a single entity, this is for illustrative purposes only. In some implementations, processor(s) may include a plurality of processing units. These processing units may be physically located within the same device, or processor(s) may represent processing functionality of a plurality of devices operating in coordination.

Processor(s) may be configured to execute machine-readable instruction modules by software, hardware, firmware, some combination of software, hardware, and/or firmware, and/or other mechanisms for configuring processing capabilities on processor(s). As used herein, the term "machine-readable instruction component" may refer to any component or set of components that perform the functionality attributed to the machine-readable instruction component. This may include one or more physical processors during execution of processor readable instructions, the processor readable instructions, circuitry, hardware, storage media, or any other components.

Figure 4:
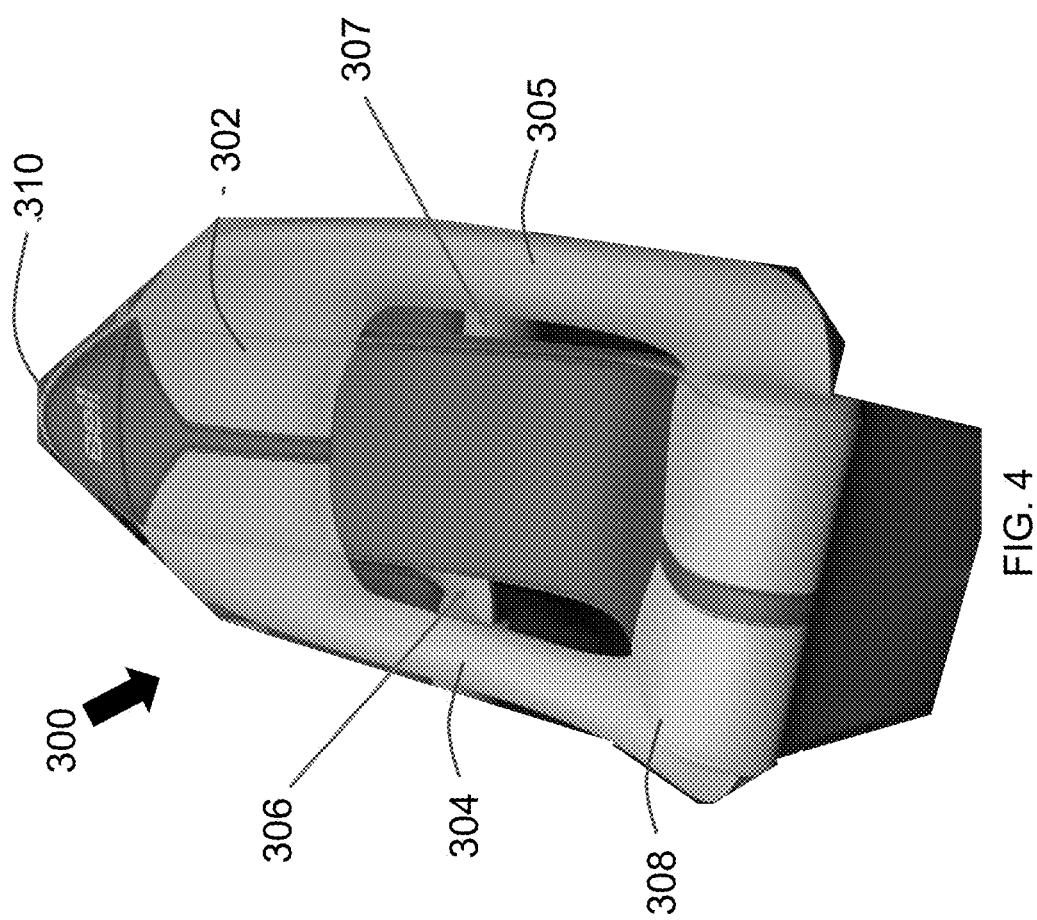
FIG. 4 illustrates a perspective view of a passenger seat, in accordance with one embodiment of the present invention.

FIG. 4 illustrates a perspective view of a passenger seat 300, in accordance with one embodiment of the present invention. The passenger seat 300 includes a contoured structure 302, a headrest 310, a seat 308, and a plurality of support members 304, with openings 306 between each support member and the contoured structure 302.

The contoured structure 302 includes ergonomically formed and padded surfaces. The contoured structure 302 can include an articulated frame encapsulated in a foam padding. The foam can be a high density foam, a polyurethane foam, a memory foam, or other suitable material. The contoured structure 302 has a top side and a bottom side, as well as left and right sides. The bottom side of the contoured structure 302 is contoured forward, avoiding the traditional crack between a seat's backrest and seat member. The articulated frame can be motorized, in a manner similar to an adjustable bed, to position the seat or recline the contoured structure 302. Alternatively, the passenger seat 300 can be fully extended horizontally to substantially form a bed.

A headrest 310 can be integrated with a top of the contoured structure 302. The headrest 310 can include an articulated frame encapsulated in a foam padding. The foam can be a high density foam, a polyurethane foam, a memory foam, or other suitable material. A seat 308 can be integrated with a bottom of the contoured structure. Alternatively, the contoured structure 302 and the seat 308 are integrated into a single body. The contoured structure 302 can curve forward to form at least a portion of the seat 308. The seat 308 can include an articulated frame encapsulated in a foam padding. The foam can be a high density foam, a polyurethane foam, a memory foam, or other suitable material.

A left support member 305 can be coupled to a first side of the contoured structure 302, proximate the top of the contoured structure 302, the left support member 305 extends downwardly toward and couples to a first side of the seat 308. The left support member 305 can include an articulated frame encapsulated in a foam padding. The foam can be a high density foam, a polyurethane foam, a memory foam, or other suitable material. A first opening can be disposed between the left support member 307 and the first side of the contoured structure 302.

A right support member 304 can be coupled to a second side of the contoured structure 302, proximate the top of the contoured structure 302, the right support member 304 extends downwardly toward and couples to a second side of the seat 308. The right support member 304 can include an articulated frame encapsulated in a foam padding. The foam can be a high density foam, a polyurethane foam, a memory foam, or other suitable material. A second opening 306 can be disposed between the right support member 304 and the second side of the contoured structure 302.

Advantageously, the contoured structure 302, the headrest 310, the seat 308, the left support member 305, and the right support member 304 can cradle a portion of a passenger's body to support the passenger during travel. The passenger seat 300 can be a unibody construction having curved surfaces, as opposed to hard edges to promote comfort and ergonomic fit. In another embodiment, a plurality of meshed vents can be disposed within the contoured backrest and the seat. In yet another embodiment, lighting elements are disposed in at least a portion of a seam of the passenger seat 200. The lighting elements are preferably LEDs, but can alternatively be incandescent bulbs or other suitable lighting device. The LEDs can be color changing or dimmable, controllable by the passenger or authorized personnel.

Figure 5A:
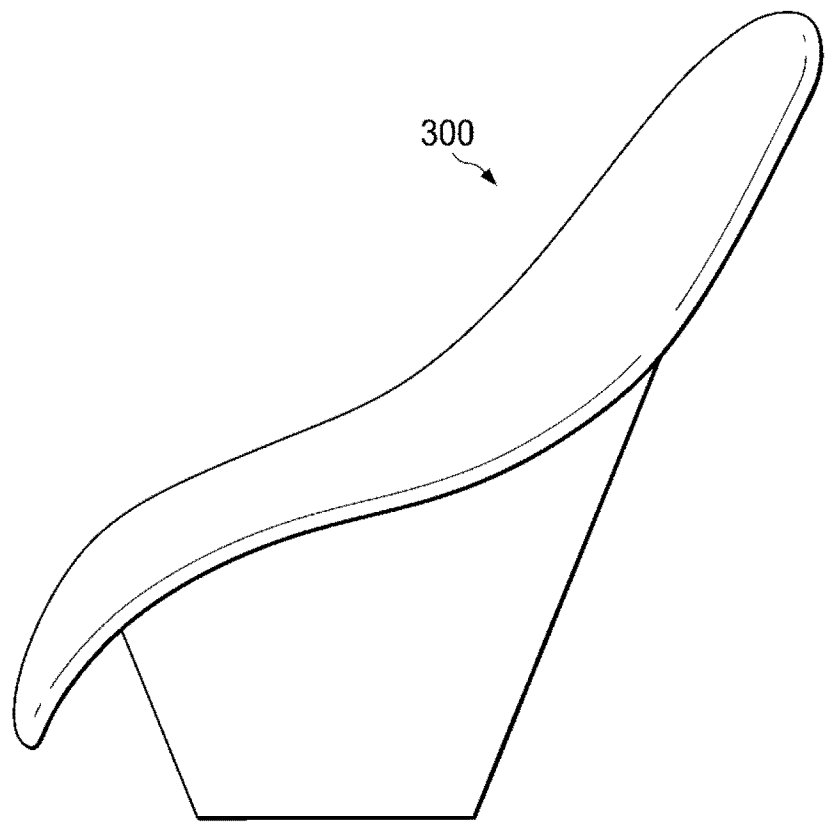
FIG. 5A illustrates a side view of a passenger seat in an upright position and FIG. 5B, illustrates a side view of a passenger seat in a fully-extended position, in accordance with another embodiment of the present invention.
Figure 5B:
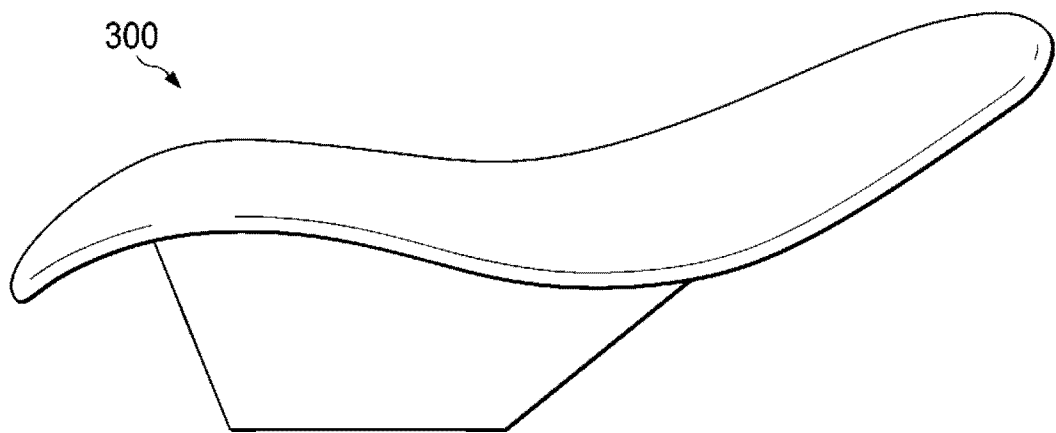

FIG. 5A illustrates a side view of a passenger seat in an upright position and FIG. 5B, illustrates a side view of a passenger seat in a fully-extended position, in accordance with another embodiment of the present invention. The contoured structure, the headrest, the seat, the left support member, and the right support member of the passenger seat 300 can extend horizontally to substantially form a bed. The articulated frame can be motorized, in a manner similar to an adjustable bed, to position the seat or recline the contoured structure 202. The passenger seat 300 can extend and retract manually or automatically, via one or more controls on the seat 300. Alternatively, a foot rest can extend from beneath passenger seat 300. In another embodiment, the contoured structure, the headrest, the seat, the left support member, and the right support member, and the foot rest of the passenger seat 300 can be controlled individually via controls on or near the seat, operably coupled to the articulated frame via one or more motors, controllers, or pneumatic devices.

Figure 6:
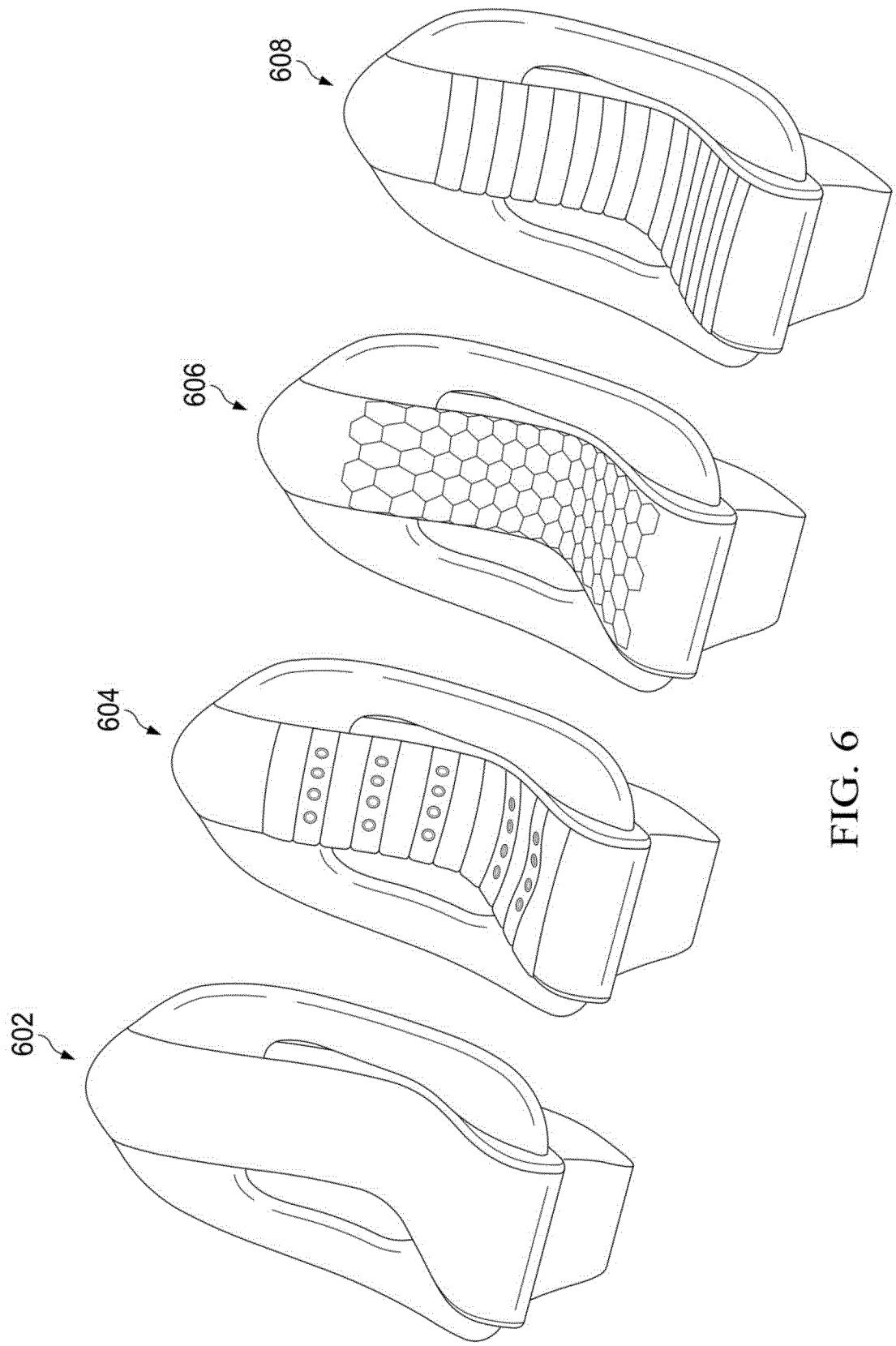
FIG. 6 illustrates multiple perspective views of a passenger seat, according to different embodiments of the present invention.

FIG. 6 illustrates multiple perspective views of passenger seats 602, 604, 606, and 608, according to different embodiments of the present invention.

Figure 7:
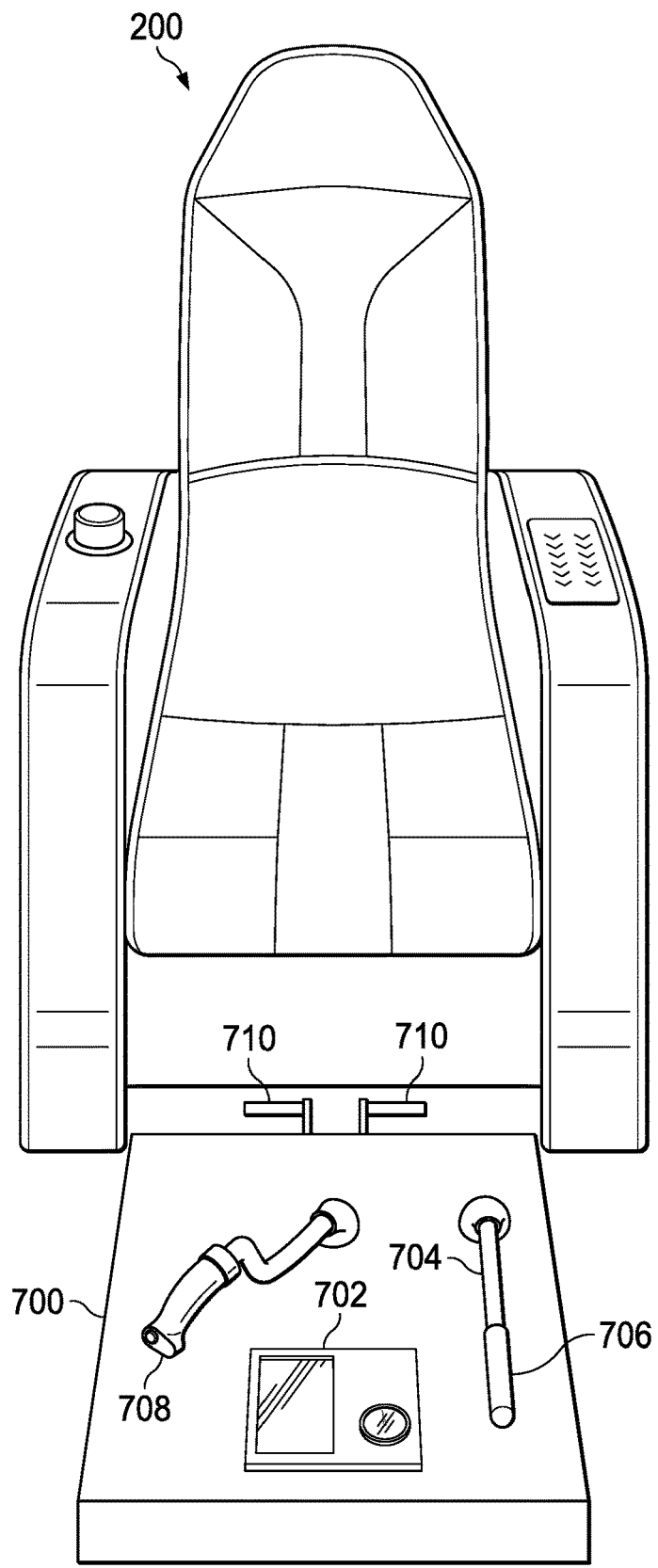
FIG. 7 illustrates a perspective view of a retractable under-seat module having controls for use in emergencies including a display device, a cyclic, a collective, anti-torque pedals, and a throttle, can be deployed from within or proximate to the pilot seat, in accordance with another embodiment of the present invention.
Figure 1:
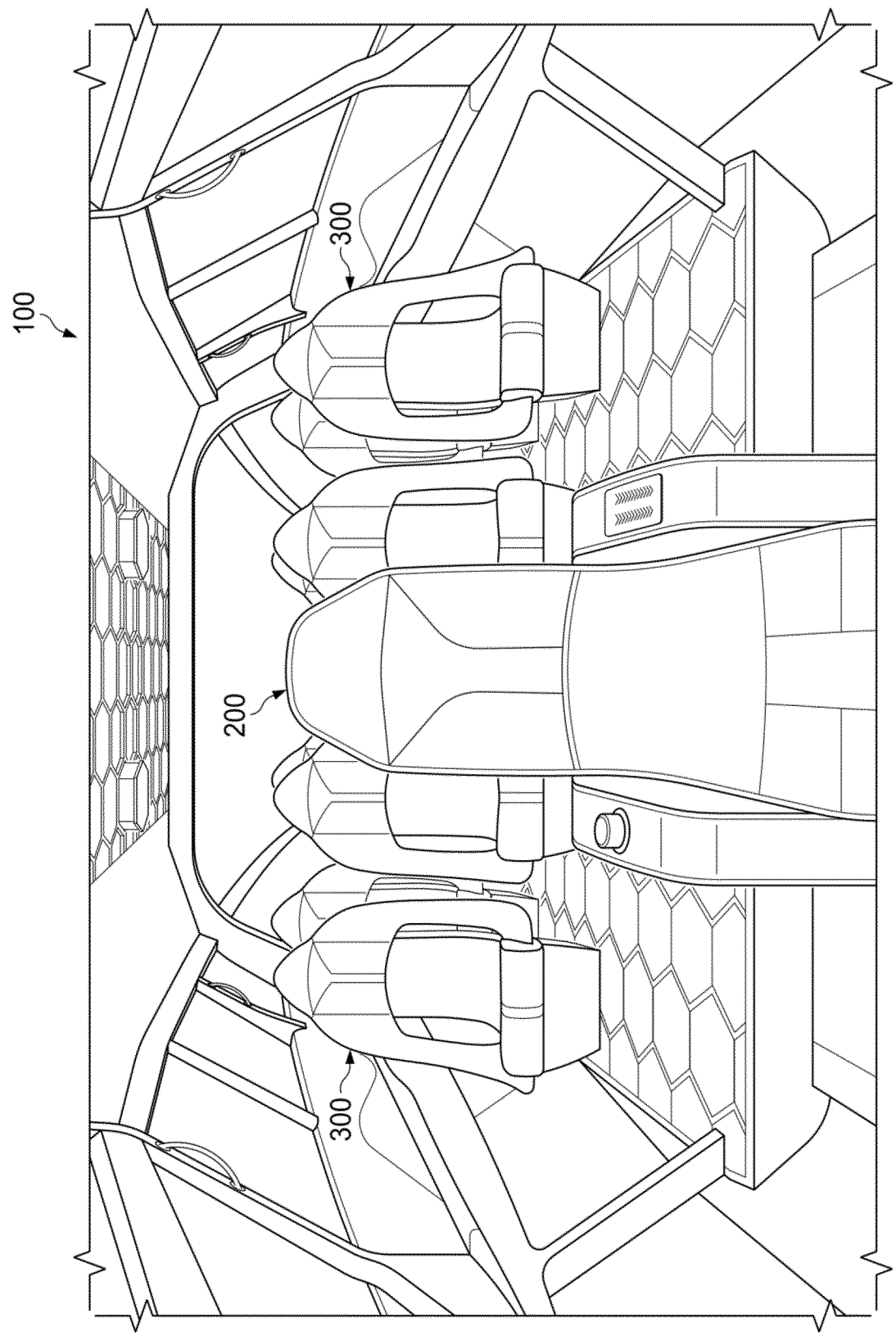
Figure 2:
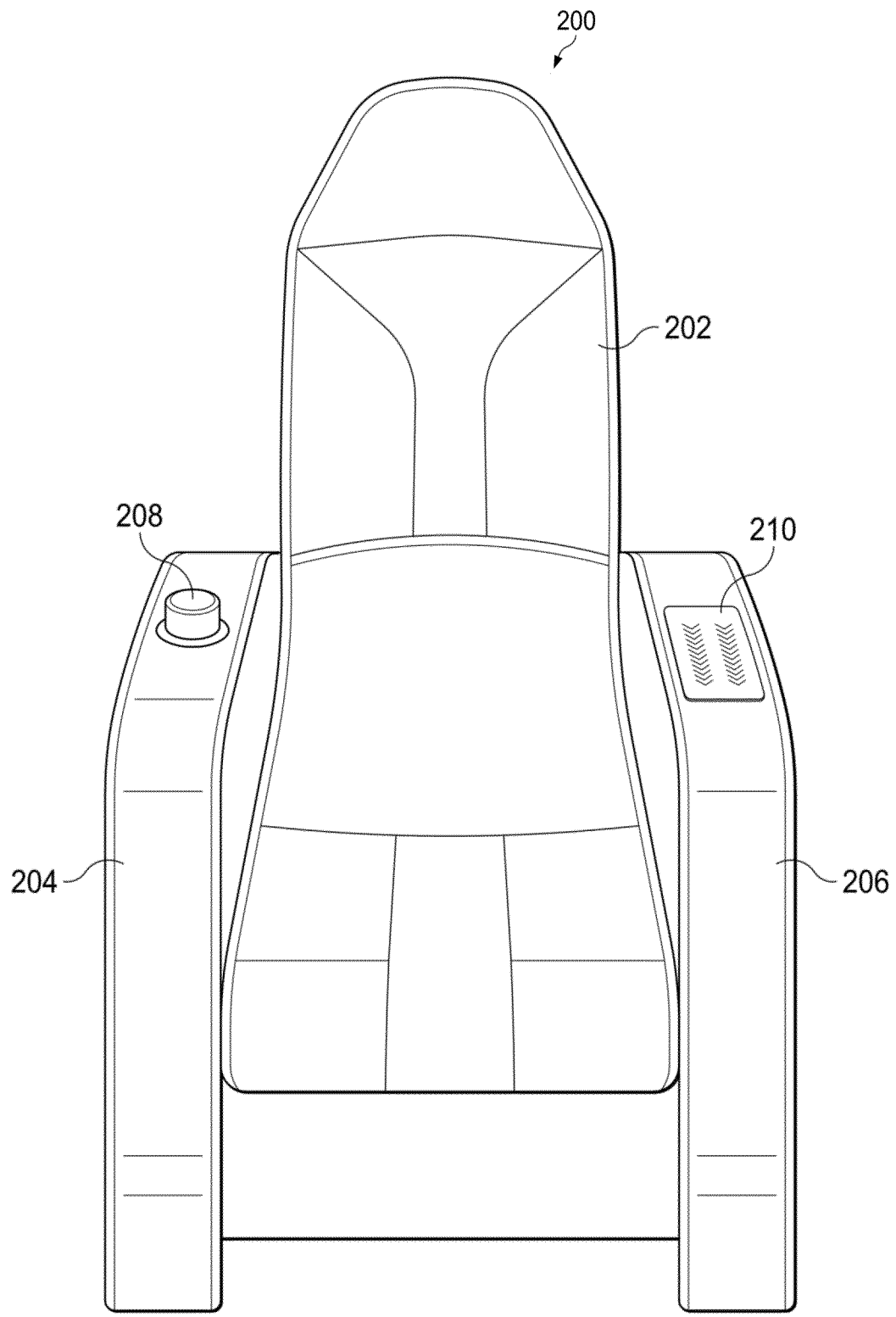
Figure 3:
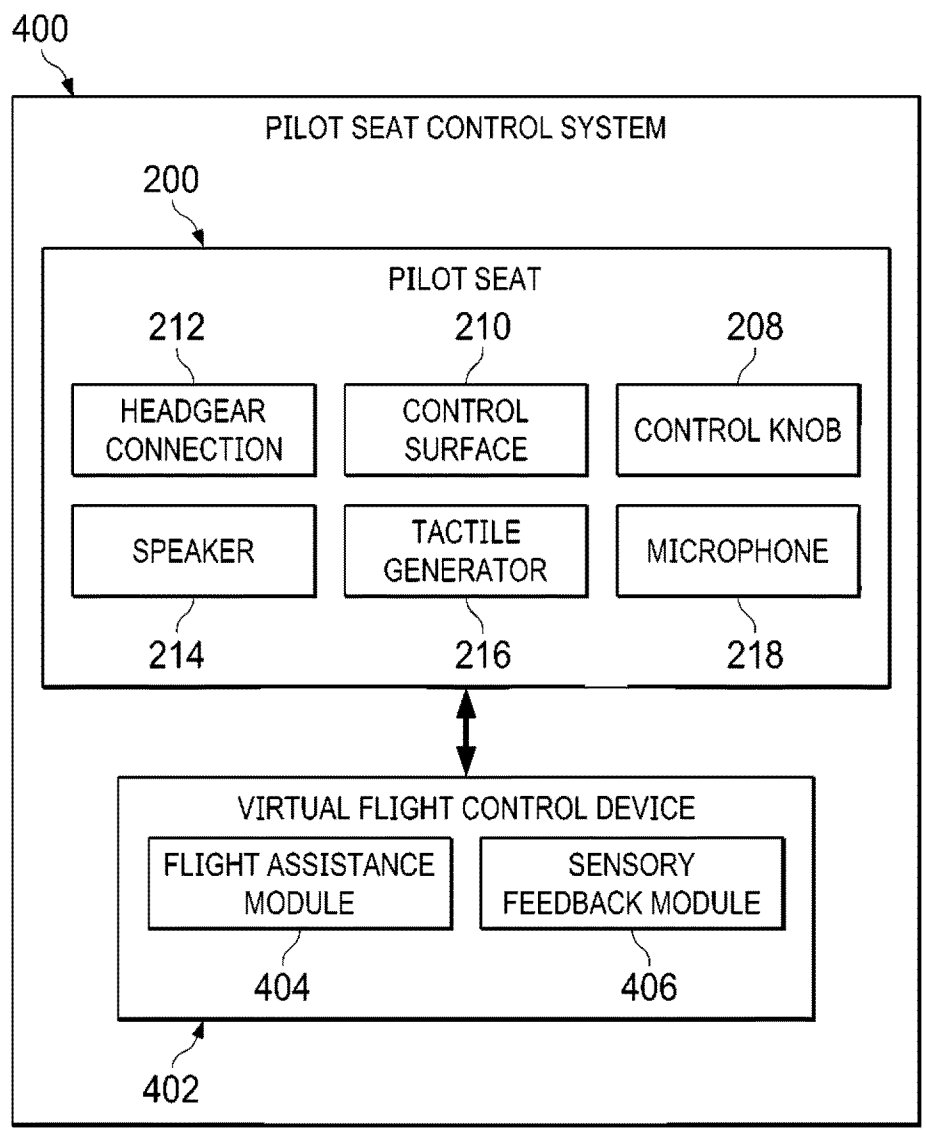
Figure 4:
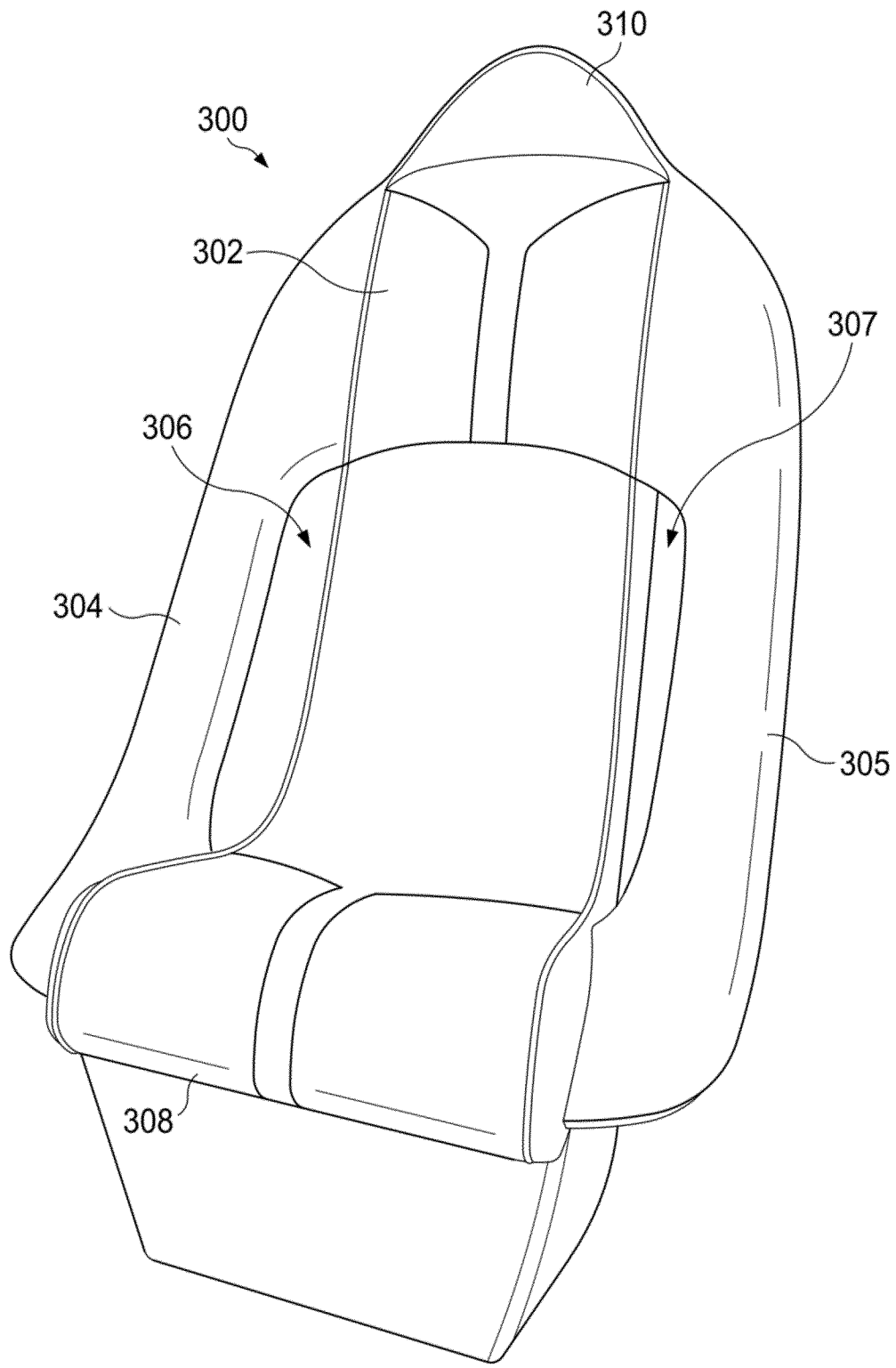

As shown in FIG. 7, in order to provide redundant controls in the event of a system failure, a retractable under-seat module 700 having controls for use in emergencies including a display device 702, a cyclic 708, a collective 704, anti-torque pedals 710, and a throttle 706, can be deployed from within or proximate to the pilot seat 200. The module 700 can be disposed under the pilot seat 200, and deployed in the event of a system failure to allow the pilot to control the aircraft.

The present invention achieves advantages over the prior art, including a contoured structure that provides ergonomic support to a pilot or passenger. A control knob and control surface can replace the functionality of an aircraft's flight stick and pedals in a much more compact, intuitive, and ergonomic package. Pilot-specific configuration of flight controls for ease of use and added functionality, among others.

While the present invention has been described in detail, it is not intended to be limited. Accordingly, various changes, variations, and substitutions may be made without departing with the scope of the invention as disclosed.

What is claimed is:

1. A pilot seat, comprising: a contoured structure having ergonomically formed and padded surfaces; a left arm support connected to the contoured structure; a right arm support connected to the contoured structures and a retractable under-seat module containing controls including a display device, a cyclic, a collective, anti-torque pedals, and a throttle for use in emergencies, wherein the right arm support includes an articulated control knob that is movable in three rectangular axes and rotatable about a vertical axis to provide one or more aircraft steering functions for an aircraft, and wherein the left arm support includes a touch-sensitive control surface for controlling one or more power system components.

2. The pilot seat of claim 1, wherein the power system controls include engine throttle, engine speed, and fuel delivery.

3. The pilot seat of claim 1, wherein the aircraft steering functions include control of an aircraft's yaw, pitch, roll, forward, backward, right, left, and hover.

4. The pilot seat of claim 1, further comprising a headset interface adapted to receive a cable coupled to a headset.

5. The pilot seat of claim 1, further comprising a plurality of speakers adapted to steerably direct sound.

6. The pilot seat of claim 1, further comprising a tactile generator adapted to generate tactile notifications, wherein the tactile generator is controlled by a sensory feedback module.

7. A pilot seat control system, comprising: a contoured structure having a left arm support and a right arm support; an articulated control knob that is movable in a horizontal plane, along a vertical axis, and rotatable about the vertical axis, to provide one or more aircraft steering functions for an aircraft; a touch-sensitive control surface for controlling one or more power system components; a retractable under-seat module containing controls including a display device, a cyclic, a collective, anti-torque pedals, and a throttle for use in emergencies; and a virtual flight control device is operably connected to the control knob and the control surface, and configured to receive data from the control knob and the control surface to control the aircraft, wherein the virtual flight control device includes a flight assistance module and a sensory feedback module.

8. The pilot seat control system of claim 7, the sensory feedback module is configured to provide sensory alerts to the pilot related to the received data, wherein said sensory feedback module can vary the speed and duration of motors disposed within or upon the contoured structure.

9. The pilot seat control system of claim 7, further comprising a plurality of speakers, positioned to provide directional sound related to objects and elements located inside and outside of the aircraft such that the pilot perceives a sound emanating from a direction of the location.

10. The pilot seat control system of claim 7, wherein the control knob is configured to provide cyclic or collective control of the aircraft.

11. The pilot seat control system of claim 7, wherein the control surface is configured to initiate a one or more power system controls, including one or more of engine throttle, engine speed, and fuel delivery.

* * * * *

UNITED STATES PATENT AND TRADEMARK OFFICE
CERTIFICATE OF CORRECTION

PATENT NO. : 10,683,100 B2
APPLICATION NO. : 15/913756
DATED : June 16, 2020
INVENTOR(S) : Bilbrey et al.

It is certified that error appears in the above-identified patent and that said Letters Patent is hereby corrected as shown below:

In the Drawings

Please replace FIGS. 1-6 with FIGS. 1-6 as shown on the attached pages.

Signed and Sealed this
Eleventh Day of August, 2020

Andrei Iancu
*Director of the United States Patent and Trademark Office*